(12) United States Patent
van der Horst et al.

(10) Patent No.: US 8,151,116 B2
(45) Date of Patent: Apr. 3, 2012

(54) MULTI-CHANNEL USER AUTHENTICATION APPARATUS SYSTEM AND METHOD

(75) Inventors: Timothy van der Horst, Provo, UT (US); Kent Seamons, Cedar Hills, UT (US)

(73) Assignee: Brigham Young University, Provo, UT (US)

( * ) Notice: Subject to any disclaimer, the term of this patent is extended or adjusted under 35 U.S.C. 154(b) by 1049 days.

(21) Appl. No.: 11/760,742

(22) Filed: Jun. 9, 2007

(65) Prior Publication Data

US 2007/0289002 A1 Dec. 13, 2007

Related U.S. Application Data

(60) Provisional application No. 60/812,435, filed on Jun. 9, 2006.

(51) Int. Cl.
*G06F 21/00* (2006.01)

(52) U.S. Cl. ............. 713/185; 726/10; 726/17; 726/19; 726/20; 726/21; 713/183; 713/152; 705/405; 709/217; 709/218; 709/219; 709/206; 709/225; 709/203

(58) Field of Classification Search ............. 726/19, 726/10, 28, 17, 20, 21; 713/183, 185, 152; 705/405

See application file for complete search history.

(56) References Cited

U.S. PATENT DOCUMENTS

| | | | |
|---|---|---|---|
| 5,276,735 A * | 1/1994 | Boebert et al. ............ 713/167 |
| 5,664,058 A * | 9/1997 | Vysotsky .................. 704/243 |
| 5,960,411 A * | 9/1999 | Hartman et al. ............ 705/26 |
| 6,012,144 A   | 1/2000 | Pickett |
| 6,061,665 A * | 5/2000 | Bahreman ................. 705/40 |
| 6,360,254 B1* | 3/2002 | Linden et al. ............. 709/219 |
| 6,581,072 B1* | 6/2003 | Mathur et al. ............. 707/711 |
| 6,934,858 B2  | 8/2005 | Woodhill |
| 7,240,192 B1* | 7/2007 | Paya et al. ................. 713/152 |
| 7,406,501 B2* | 7/2008 | Szeto et al. ................ 709/206 |
| 7,434,252 B2* |10/2008 | Ballinger et al. ............ 726/10 |
| 7,478,434 B1* | 1/2009 | Hinton et al. .............. 726/27 |
| 7,536,712 B2* | 5/2009 | Kaler et al. ............... 726/5 |
| 7,544,504 B2* | 6/2009 | Kleimola et al. .......... 435/287.2 |
| 7,564,825 B2* | 7/2009 | Olivereau et al. ........... 370/338 |
| 7,614,002 B2* |11/2009 | Goldfeder et al. .......... 715/745 |
| 7,673,135 B2* | 3/2010 | Chin et al. ................. 713/159 |
| 7,698,361 B2* | 4/2010 | Mohamed et al. ........... 709/203 |
| 7,720,835 B2* | 5/2010 | Ward et al. ................. 707/710 |
| 7,730,137 B1* | 6/2010 | Toomey .................... 709/206 |
| 7,764,945 B2* | 7/2010 | Polk et al. ................. 455/404.1 |
| 7,861,082 B2* |12/2010 | Pinder et al. ............... 713/168 |

(Continued)

FOREIGN PATENT DOCUMENTS

GB 2350711 A * 12/2000

(Continued)

OTHER PUBLICATIONS http://en.wikipedia.org/wiki/Web_browser, Sep. 21, 2010.*

(Continued)

*Primary Examiner* — April Shan
(74) *Attorney, Agent, or Firm* — Workman Nydegger

(57) ABSTRACT

An apparatus, system, and method are disclosed for authenticating users through multiple communication channels. The authentication method of the present invention may be used to supplement password systems or replace password authentication, effectively enabling secure sharing, auditing, delegation, and revocation of authority.

50 Claims, 8 Drawing Sheets

U.S. PATENT DOCUMENTS

| | | | | |
|---|---|---|---|---|
| 2005/0188030 | A1* | 8/2005 | Hudecek | 709/206 |
| 2007/0157291 | A1* | 7/2007 | Chua | 726/4 |
| 2009/0106829 | A1* | 4/2009 | Thoursie et al. | 726/9 |

FOREIGN PATENT DOCUMENTS

| | | | |
|---|---|---|---|
| WO | WO2006112761 | * | 4/2005 |

OTHER PUBLICATIONS

Simson L. Garfinkel, Email-based Identification and Authentication: An Alternative to PKI?, IEEE Security & Privacy, Nov.-Dec. 2003, pp. 20-26, vol. 1, Issue 6, IEEE Computer Society.

* cited by examiner

MULTI-CHANNEL USER AUTHENTICATION APPARATUS SYSTEM AND METHOD

RELATED APPLICATIONS

This application claims priority to U.S. Provisional Patent Application No. 60/812,435 entitled "Email-based access control (EBAC)" and filed on 9 Jun. 2006 for Timothy W. van der Horst and Kent E. Seamons, which Application is incorporated herein by reference.

GOVERNMENT LICENSE

The U.S. Government has a paid-up license in this invention and the right in limited circumstances to require the patent owner to license others on reasonable terms as provided for by the terms of Grant No. CCR-0325951 awarded by the National Science Foundation.

FIELD OF THE INVENTION

The invention relates to the process of authenticating a user requesting access to an access restricted resource. Specifically, the invention relates to devices, methods, and systems for authenticating users through multiple communication channels.

DESCRIPTION OF THE RELATED ART

Authentication systems are deployed in a wide variety of applications to protect against the unauthorized access of resources. Passwords are the current standard for protecting against unauthorized access. The attractiveness of password authentication is clear: passwords are easy to configure and password protection is accessible to even the most novice user. Passwords may be a secure method of authentication when a unique strong password is used for each account and the password is never shared.

Unfortunately, users frequently reuse passwords, share password information, and request password resets through a single unsecured channel such as email. As such, user account passwords are frequently compromised. Packet sniffers, phishing websites, and social engineering techniques have been developed to extract password information from unsuspecting users. If the user has reused that password on other sites, the malicious party may use the password to gain access to multiple resources.

Furthermore, tracking who has access to which passwords may pose a challenge to users. Users that should no longer have access to a resource may still be able to gain access with a password that has not been changed. Conversely, frequently changing a password may revoke access to someone that needs continued access to a resource.

SUMMARY OF THE INVENTION

From the foregoing discussion, Applicants assert that a need exists for an apparatus, system, and method that can authenticate users through multiple communication channels. Beneficially, such an apparatus, system, and method would provide streamlined user authentication with enhanced security.

The present invention has been developed in response to the present state of the art, and in particular, in response to the problems and needs in the art that have not yet been fully solved by currently available authentication means and methods. Accordingly, the present invention has been developed to provide an apparatus, system, and method to facilitate authentication of a user requesting access to an access restricted resource that overcome many or all of the above-discussed shortcomings in the art.

The apparatus to facilitate authentication of a user may be an authentication server that is provided with a plurality of modules configured to functionally execute the necessary steps of the authentication process. In one embodiment, the authentication server includes a validation module that validates a user identifier, a token generation module that generates a plurality of authentication tokens, a token distribution module that distributes the plurality of authentication tokens, and a token validation module that receives at least one submitted token and determines if the at least one submitted token corresponds to the plurality of authentication tokens.

The validation module may validate the user identifier by using regular expressions, form validation techniques, or other formatting rules. The validation module may also use querying or electronic messaging to determine if an electronic address exists and is valid.

The token distribution module may deliver one or more of the generated authentication tokens in the form of cookies. The cookies may be session cookies. The token distribution module may also deliver one or more tokens via electronic messages. The electronic messages may be delivered through any available electronic messaging services and/or channels. Several examples include email messaging, telephone text messaging, pager messaging, and instant messaging.

In one embodiment, the token validation module determines if one or more submitted tokens correspond to the tokens delivered through cookies and electronic messages. The token validation module may also determine if a token has expired. In certain embodiments, the token validation module compares the time that the token was generated or delivered to the time that the token was submitted. If the difference is not within a specified time frame, the token will be considered invalid. The tokens may be configured or selected to be short lived and limited to one-time use.

In one embodiment, the token validation module determines if at least m valid tokens were received by the client from a set of n distributed tokens, wherein m and n are integers greater than 1 and m is less than n. For example, the token generation module may generate four authentication tokens to be distributed among various communication channels. However, in this example, the token validation module may only require reception of two of the tokens by the client to authorize access. By reducing the number of required valid tokens, the present invention may operate in environments where communication is less reliable. Conversely, when a higher level of security is required, a higher number of tokens may be established.

Further security may also be implemented by password verification on the part of the validation module. A communication module may also be used to establish a secure connection between the user and the authentication server. The electronic messages may be encrypted by the communication module.

The authentication server may further include one or more modules configured to handle delegation. In one embodiment, the token distribution module is configured to include delegation information within the headers or body of the electronic message. For example, a string may be appended to an email address to indicate that the electronic message should be forwarded or delegated to another user. In certain embodiments, an auditing module tracks user access, privileges, and delegations. Electronic message notifications of resource usage may also be generated by the auditing module.

In another aspect of the present invention, an authentication client, such as a client computing device, includes an access request module that submits a user identifier that corresponds to an electronic address to an authentication server for a user that is requesting access to an access restricted resource. The authentication client also includes means for retrieving authentication tokens provided to the client via multiple communication channels.

The authentication client may utilize a web browser to receive a cookie with an authentication token embedded therein. The cookie may be a session cookie. The browser may be configured to automatically submit the cookie to the authentication server.

The authentication client may also utilize a token collection module that retrieves one or more authentication tokens from electronic messages distributed by the authentication server through various channels and/or messaging services. Examples of electronic messages include email messages, text messages, pager messages, instant message and the like. Since the electronic messages may include additional authentication tokens, the token collection module may parse the electronic messages to retrieve the additional authentication tokens. In certain embodiments, the token collection module decrypts one or more electronic messages to retrieve authentication tokens transported by the electronic messages to the authentication client.

As explained above, more tokens may be issued than required for access to be granted to a resource. On the authentication client, the collection module may be configured to retrieve at least m valid tokens from a set of n distributed tokens wherein m and n are integers and m is less than n. The collection module may exit the token retrieval process if a sufficient number of valid authentication tokens have been received.

The authentication client may also include a user interface module configured to display a single-click login control. In certain embodiments, a user may initiate the use of the authentication processes presented herein through the single-click login control. The single-click login control may be usable for a wide variety of web sites and computing resources. The ability to use a single-click login control for a wide variety of web sites and computing resources provides a significant enhancement over prior art solutions, which typically require that the user remember a password for each web site or computing resource.

In another aspect of the present invention, a system to authenticate a user requesting access to an access restricted resource includes an authentication server and authentication client such as the above mentioned authentication server and authentication client. In one embodiment, the authentication server includes a user validation module that receives a user identifier and determines if the user identifier is a valid identifier corresponding to an electronic address, a token generation module that generates a plurality of authentication tokens for an authentication client, a token distribution module that distributes the plurality of authentication tokens to the client via a plurality of communication channels, and a token validation module that receives at least one submission token from the authentication client and validates that the at least one submission token corresponds to the plurality of authentication tokens.

The system to authenticate a user may also include an authentication client such as a client computing device. In one embodiment, the authentication client includes an access request module that submits a user identifier to an authentication server, a token collection module that receives a plurality of authentication tokens from a plurality of communication channels, and a token submission module that submits at least one submission token to the authentication server, the at least one submission token corresponding to the plurality of authentication tokens. In one embodiment, the submitted tokens correspond to at least m valid tokens from a set of n distributed tokens. The system may also include a messaging server that collects a message for a user and provides the message in response to a message query.

In another aspect of the present invention, a method to authenticate a user includes receiving a user identifier from a user that is requesting access to an access restricted resource, determining if the user identifier is a valid identifier corresponding to an electronic address, generating a set of authentication tokens, providing the set of authentication tokens to the client via a cookie and one or more electronic messages, receiving one or more submitted tokens from the client and determining if the submitted tokens correspond to the generated set of authentication tokens.

If further security is warranted, a secure connection may be established between the authentication server and the authentication client. The cookie may be a session cookie. The electronic messages may be sent in a variety of communication protocols including an email protocol such as pop, IMAP, or SMS, an instant messaging protocol such as Jabber, a paging protocol, and http. Tokens and electronic messages may be delegated by including delegation information in the electronic messages or cookies in order to redirect the tokens to other users.

In another aspect of the present invention, a method to facilitate authentication of a user includes submitting a user identifier to an authentication server for a user requesting access to an access restricted resource via a browser, wherein the user identifier corresponds to an electronic address, receiving a cookie comprising a first authentication token, retrieving an electronic message sent to the electronic address, the electronic message comprising a second authentication token, and submitting at least one submission token to the authentication server, the at least one submission token corresponding to the first and second authentication tokens.

The present invention provides distinct advantages over the prior art. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
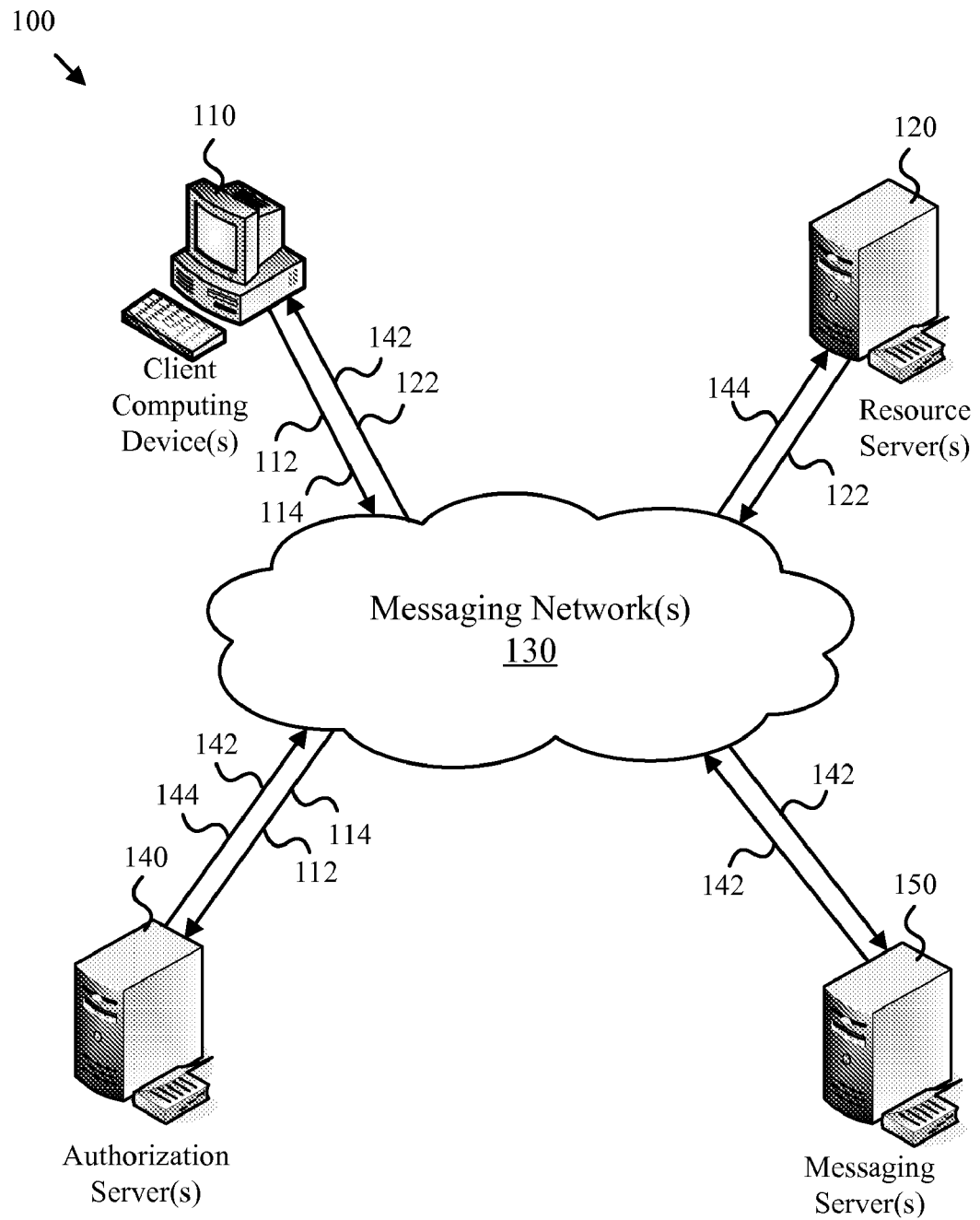
FIG. 1 is a block diagram depicting one embodiment of a user authentication system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium or computer readable medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a block diagram depicting one embodiment of an authentication system 100 in accordance with the present invention. The depicted authentication system 100 includes one or more client computing devices 110, one or more resource servers 120, one or more messaging networks 130, one or more authorization servers 140, and one or more messaging servers 150. The authentication system 100 enables a client computing device 110 to gain access to access restricted resources provided by the resource servers 120.

The client computing device 110 may be any device capable of communicating over the messaging networks 130. The client computing device 110 requests permission to access an access restricted resource by sending an access request 112. The access request 112 may contain data that uniquely identifies the client computing device and/or the requesting user. In one embodiment, the access request includes an electronic address associated with the user such as an email address. In another embodiment, the access request includes a login name or similar identifier that uniquely identifies a user or group of users.

In response to sending the access request, the client computing device 110 may receive two or more authorization tokens 142 that are delivered via separate channels from an authorization server 140 or the like. In one embodiment, one of the authorization tokens is delivered via a direct channel or connection such as an http session while the other authorization tokens are delivered via indirect (i.e. messaging) channels via messages such as email messages or text messages. In response to receiving the authorization tokens 142, the client computing device 110 may provide one or more submission tokens that correspond to the authorization tokens 142 and thereby enable the client computing device 110 to access an access restricted resource controlled by the resource servers 120 and receive resources 122.

The resource servers 120 may store and/or provide content, web pages, account information, network access, or similar resources for which public access is undesirable or inappropriate. The resource servers 120 may require that a user be authorized by the authorization servers 140 previous to granting access to the resources controlled by the resource servers 120. In one embodiment, the resource servers 120 will only provide resources 122 in response to receiving a permission indicator 144 corresponding to the particular user. In some embodiments or situations, a resource server 120 and an authorization server 140 may be combined into the same server.

The messaging networks 130 facilitate communication between the various servers and devices attached thereto. The communication may be message oriented or session oriented. The messaging networks 130 may include networks that are dedicated to particular methods of communication such as a paging networks, cell phone networks, or a telephone networks. The messaging networks 130 may also include internetworks such as intranets or the Internet.

The authorization server 140 receives and analyzes the access requests 112. If the access requests 112 are valid, the authorization server 140 generates the authentication tokens 142. The authorization server 140 may encrypt the authentication tokens 142. The authorization server 140 receives the submission tokens 114 and may verify that the submission tokens 114 received from the client computing device 110 match the originally generated authentication tokens 142. If the submission tokens 114 match the originally generated tokens 142, the authorization server may establish permissions 144 for the user to access the desired resource. In one embodiment, the permissions 144 are communicated to the resource server via the messaging network 130. In another embodiment, the permissions are communicated via a dedicated channel or connection.

The authentication system 100 may be automated. In prior art authentication systems, users are often required to click on an authentication link in an electronic message to complete account registration. In certain embodiments, the present invention automates the authentication process, by automatically retrieving the authentication tokens 142 from an electronic messaging server and submitting the tokens without requiring user involvement. Furthermore, passwords are not required by the authentication server in the present invention, thus providing a more fluid experience for users requesting access. Nevertheless, passwords may be implemented in tandem with the authentication system 100 to provide additional security.

Figure 2:
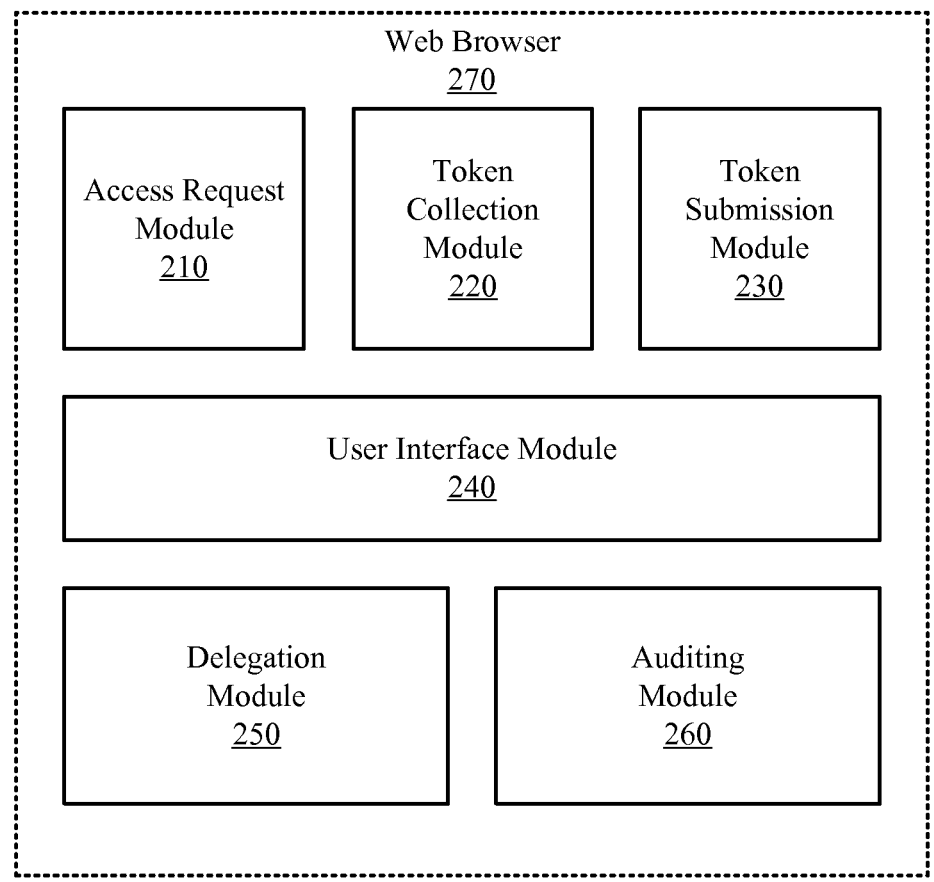
FIG. 2 is a block diagram depicting one embodiment of a user authentication client of the present invention.

FIG. 2 is a block diagram depicting one embodiment of a user authentication client 200 of the present invention. As depicted, the authentication client 200 includes an access request module 210, a token collection module 220, a token submission module 230, a user interface module 240, a delegation module 250, and an auditing module 260. The authentication client 200 enables the storage and use of tokens for authenticating a user against an access restricted resource. In certain embodiments, the authentication client 200 also enables the transfer (i.e. delegation) of authorization tokens to other users or computing devices and client based auditing of authorization messages and/or tokens. The authentication client 200 is one example of the client computing device 110 depicted in FIG. 1.

The various modules of the authentication client 200 may be associated with a web browser 270 or another type of executable program that is programmed to store tokens and retrieve content for a computing device such as the client computing device 110. While FIG. 2 depicts one particular implementation, the modules contained in the user authentication apparatus 200 may be external to a web browser or other executable environment. For example, some of the modules disclosed may operate as independent entities, data stores, or executables.

The access request module 210 initiates a request for access to an access restricted resource such as a web page or downloadable content. The access request module 210 may also submit any relevant electronic identification or data necessary to initiate the request, such as an electronic address.

The token collection module 220 collects and stores relevant data tokens such as the authentication tokens 142 that are necessary for the client computing device to authenticate with a server or content provider. The token collection module 220 may store direct authentication tokens such as cookies or data strings, or indirect authentication tokens such as those embedded in an electronic message. Both indirect and direct authentication tokens may be stored in various data stores such as text files, client databases, browser cookies, or other storage mechanisms used to maintain data used by the token collection module 220.

The token collection module 220 may also parse electronic messages to extract relevant data and authentication tokens. The token collection module 220 may aggregate authentication tokens from multiple channels including, but not limited to, email channels, text messaging channels, http channels, paging channels, and the like. The token submission module 230 delivers one or more submission tokens 114 to the authentication server 140 or the like. The submission tokens 114 may correspond directly or indirectly to the tokens aggregated or extracted by the token collection module 220.

The authentication client 200 may also include a user interface module 240. The user interface module 240 enables users to make changes to electronic message addresses, electronic message passwords, and any other settings common to an email or other messaging client, thereby enabling the authentication client 200 to automatically collect direct or indirect tokens provided by an authentication server 140 or the like. The user interface module 240 may be implemented in the form of a toolbar, executable, or browser plug-in, or any other user accessible interface that enables user management of authentication features and capabilities. The user interface module 240 may also provide an interface for the configuration of electronic message retrieval associated with authentication. In certain embodiments, further account settings such as the auto-deletion of retrieved electronic messages may be configured through the user interface module 240.

The authentication client 200 may include a delegation module 250. The delegation module 250 enables a user to grant additional users access to the access restricted resource by forwarding tokens directly or indirectly to the additional users. The delegation module 250, for example, may be used to establish forwarding rules on one or more electronic message accounts, so that future authentication tokens are automatically forwarded by the electronic message service provider. Depending upon the embodiment, the delegation module 250 may provide complete delegation, selective delegation, one time delegation, or all of the above. In some embodiments, one or more delegation rules may be specified by the delegation module 250 or through existing interfaces developed by electronic message service providers. In certain embodiments, the delegation module 250 may also be used to revoke access to an access restricted resource.

In prior art password delegation and tracking systems, a content server or the like is typically responsible for any and all delegation tracking. If a user shares their password, it is very difficult for the content server to distinguish between different individuals using the same login. The present invention reduces the need for server side delegation tracking and provides a way to distinguish user logins. For example, the auditing module 260 may audit the authentication processes and multiple user logins without any support from the content server. Any authentication attempt must necessarily pass through a known electronic message account or server, thus enabling access and auditing by the by the auditing module 260. By saving a copy of the messages that are forwarded, or the data contained therein, the auditing module 260 may maintain a client based audit trail independent of any server side auditing.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
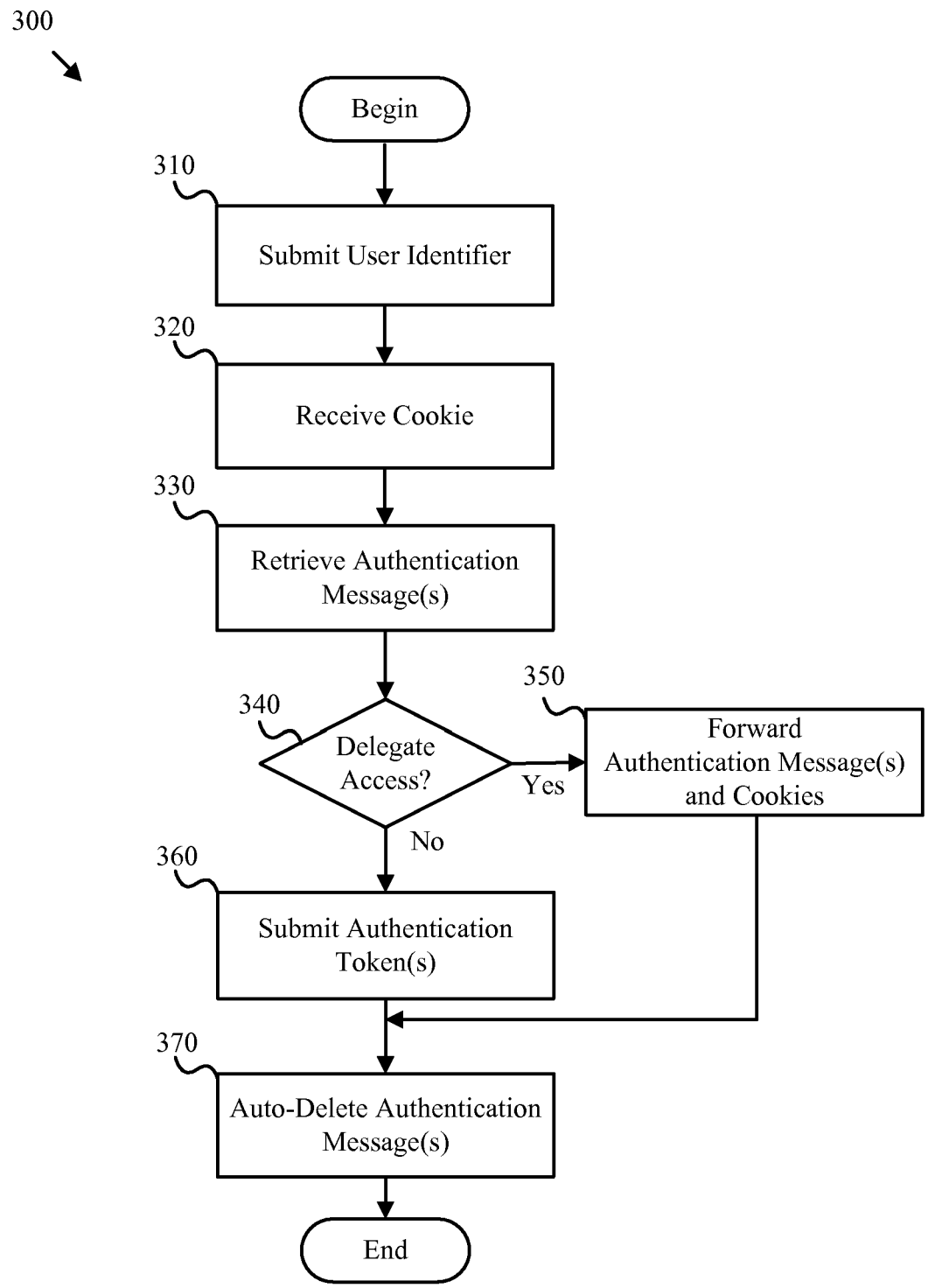
FIG. 3 is a schematic flow chart diagram illustrating one embodiment of a user authentication method from the perspective of the client in accordance with the present invention.

FIG. 3 is a flow chart depicting one embodiment of a user authentication method 300. As depicted, the user authentication method 300 includes submitting 310 a user identifier, receiving 320 a cookie, retrieving 330 one or more authentication messages, and determining 340 if access should be delegated. The authentication method may also include forwarding 350 authentication messages and/or cookies, submitting 360 authentication tokens, and auto-deleting 370 authentication messages. The user authentication method 300 facilitates user authentication and access to an access restricted resource.

Submitting 310 a user identifier may include submitting an electronic address that uniquely identifies a user or a specific client computing device. Receiving 320 a cookie may entail receiving and storing data that is intended to act as an access token. The cookie, or token, may be stored through traditional browser methods or through a data storage module configured to handle data transferred from a server. The cookie, or token, may be directly communicated to the client from a server and may be encrypted. Receiving 320 the cookie, may also include translating, rendering, or decoding an encrypted data string.

Retrieving 330 authentication messages may include examining and extracting data that has been indirectly delivered to the client computing device through a third party delivery mechanism such as an electronic messaging service. Retrieving 330 authentication messages may also include parsing or popping emails, instant messages, text messages, pager messages, and the like. The process of extracting data may be automated or controlled by a user. The data extraction may be implemented over a wide range of protocols including email protocols, text messaging protocols, instant messaging protocols, pop, http, IMAP, and paging protocols.

Retrieving 330 multiple authentication messages from several electronic message providers or networks provides additional security. Retrieving tokens from several electronic messages or channels minimizes the ability of an intruder to gain unauthorized access to a resource. In order to access the restricted resource, the intruder would need access to the tokens delivered via separate independent electronic messaging services. In certain embodiments, retrieving 330 authentication messages includes converting the retrieved messages to data tokens that are used in the authentication process.

The simultaneous use of both an indirect delivery channel, such as email, and a direct channel, such as a cookie, provides several security benefits over the traditional use of indirect authentication delivery. Utilizing tokens from both delivery methods substantially reduces the threat of passive attacks, such as packet sniffing, compromising electronic message accounts, and the like. Since both indirect and direct tokens may be required for access to be granted, an intercepted packet or message will not provide sufficient authentication, and the passive attack may be thwarted. Similarly, an active attack would require access to both the direct and indirect tokens transmitted to the client computing device, making a direct attack more difficult to achieve than in prior art systems.

The present invention also minimizes the threat of phishing, where an individual or web site poses as a legitimate resource to encourage a user to divulge password information. Since multiple tokens must be submitted in addition or in place of a password, the phishing site would need to obtain the relevant tokens to gain access. The phishing site, in effect, would need to monitor multiple communication channels, retrieve a password from a user, and submit authentication tokens in order to gain access to a resource. The present invention presents a significant hurdle to those seeking unauthorized access to a resource.

Determining 340 if access should be delegated may involve checking delegation rules associated with a user or the client computing device. Determining 340 if access should be delegated may also include querying the user for a delineation of delegation privileges. Access may thus be delegated automatically or manually by a user. In the case that access is delegated, the method proceeds to forward 350 authentication messages, cookies, and any relevant tokens to another user or computing device.

Forwarding 350 authentication tokens may include generating a record of the transfer and the type of access granted. A record of forwarded delegations provides an auditing record on the client computing device that can be referenced to determine which delegated users have accessed the restricted resource, as well as the level of access the user has been granted. Forwarding 350 authentication tokens further provides a level of privacy not found with traditional password sharing. Since prior art authentication procedures typically require the use of a password, the password must be released by a user and thereby compromised in order for others to access restricted information. By implementing an authentication forwarding system instead, the user authentication method 300 enables the user granting access to refrain from divulging sensitive password information.

In the case that access is not delegated, the client computing device may submit 360 one or more submission tokens. Tokens may be submitted manually, for example, by a user clicking a link in an authentication message, or automatically through a toolbar utility or automatic token aggregator or the like. The proper submission of one or more submission tokens by the client computing device may result in access being granted to the restricted resource.

Depending on user settings and preferences, the authentication method 300 may further facilitate auto-deleting 370 authentication messages, cookies, and tokens relating to authentication. Auto-deleting 370 authentication messages may involve accessing messaging accounts to delete messages pertinent to the authentication method 300. Auto-deleting authentication messages may enhance security by removing access to tokens in the event of unauthorized access to a user's electronic messaging accounts.

Figure 4:
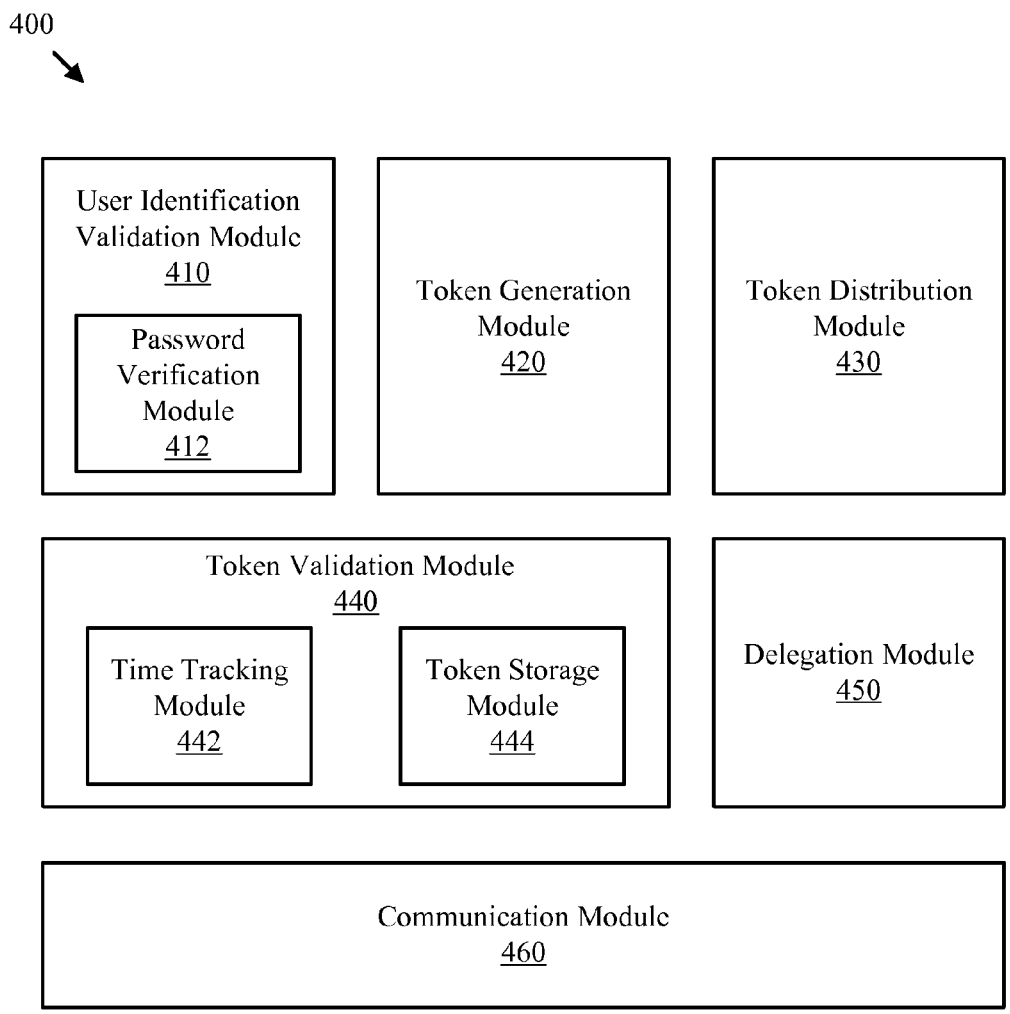
FIG. 4 is a block diagram depicting one embodiment of an authentication server in accordance with the present invention.

FIG. 4 is a block diagram depicting one embodiment of an authentication server 400. As depicted, the authentication server 400 includes a user identification validation module 410, a token generation module 420, a token distribution module 430, a token validation module 440, a delegation module 450, and a communication module 460. The authentication server 400 generates authentication tokens for distribution and validates submitted tokens in order to grant access to a resource. The authentication server 400 may establish secure channels for the transfer and reception of authorization tokens. The authentication server 400 is one example of the authentication server 140 depicted in FIG. 1.

The user identification validation module 410 receives a user identifier such as an electronic address and verifies that the user identifier is a valid identifier. For example, the user identification validation module 410 may verify that the address matches a rule, a set of regular expressions, or a text formation designed to check for properly formatted identifiers. Validation may further include verifying that the user identifier corresponds to a known user or that the electronic address is contained within a datastore. In certain embodiments, a password verification module 412 may verify that a submitted password corresponds to the user identifier and thereby provides additional security.

Once the user identifier has been validated, the user identification validation module 410 may retrieve permissions associated with the specified user identifier or the corresponding electronic address. Based on the permissions, the token generation module 420 generates two or more short lived authentication tokens. In one embodiment, the short lived authentication tokens are valid for 10 minutes. Using short lived authentication tokens ensures that the tokens will only be validated by the authentication server 400 during a specified time window.

In certain embodiments, indirect channel tokens such as electronic message tokens, and direct channel tokens are generated by the token generation module 420. In certain embodiments, additional tokens are generated by conducting logical or mathematical operations on existing tokens. For example, a direct channel token may be generated from combining a "complete" token and an electronic message token, or a complete token may be generated from the combination of indirect and direct tokens. In certain embodiments, the generation module 420 may utilize a secret splitting scheme such as an XOR operation to generate new tokens. The use of a splitting scheme effectively minimizes the number of tokens that need to be stored on the server for use in the verification process.

The token distribution module 430 transmits the tokens to the client computing device via multiple communication or messaging channels. In certain embodiments, a token distribution module 430 sends the generated tokens to the client computing device 110 through a direct channel and one or more indirect channels. The token distribution module 430 may use direct channels to set session variables, cookies, and data strings directly on the client computing device 110. The token distribution module 430 may be further equipped with messaging software configured to deliver additional authentication tokens indirectly to the user or client computing device 110 through a messaging service or the like.

The token validation module 440 receives tokens from a user or client computing device requesting access to a restricted resource. The token validation module 440 may store the received tokens in a token storage module 444 for comparison with the tokens sent out by the token distribution module 430. A time tracking module 442 may examine the received tokens to ensure that the tokens are generated and/or received within a specified time frame. In some embodiments, the tokens must contain the correct data and must be delivered to the token validation module 440 before a specified expiration time in order for access to be granted.

To prevent unauthorized access, the token validation module 410 may ignore the timestamp on the authentication token (as the timestamp is modifiable by a skilled intruder), and instead refer to the time that the tokens were issued and recorded by the token generation module 420 and the time the submission tokens were received by the authentication server 400. The token validation module 440 may also combine the tokens or execute token comparisons to generate further tokens useful in the validation process. For example, an indirect electronic message token and a direct channel http token may be combined or compared to generate a complete token. The generated, or complete tokens, can then be compared to the original token(s) generated by the token generation module 420.

In certain embodiments, the delegation module 450 transfers or issues new indirect or direct authentication tokens to delegated users. A set of new tokens may be generated to grant a user access to a subset of the access restricted resources. The delegation module 450 may be used to revoke access. The communication module 460 establishes a secure connection between the client computing device and token delivery mechanisms. Indirect tokens sent to third party messaging agents may also be secured by the communication module 460.

Figure 5:
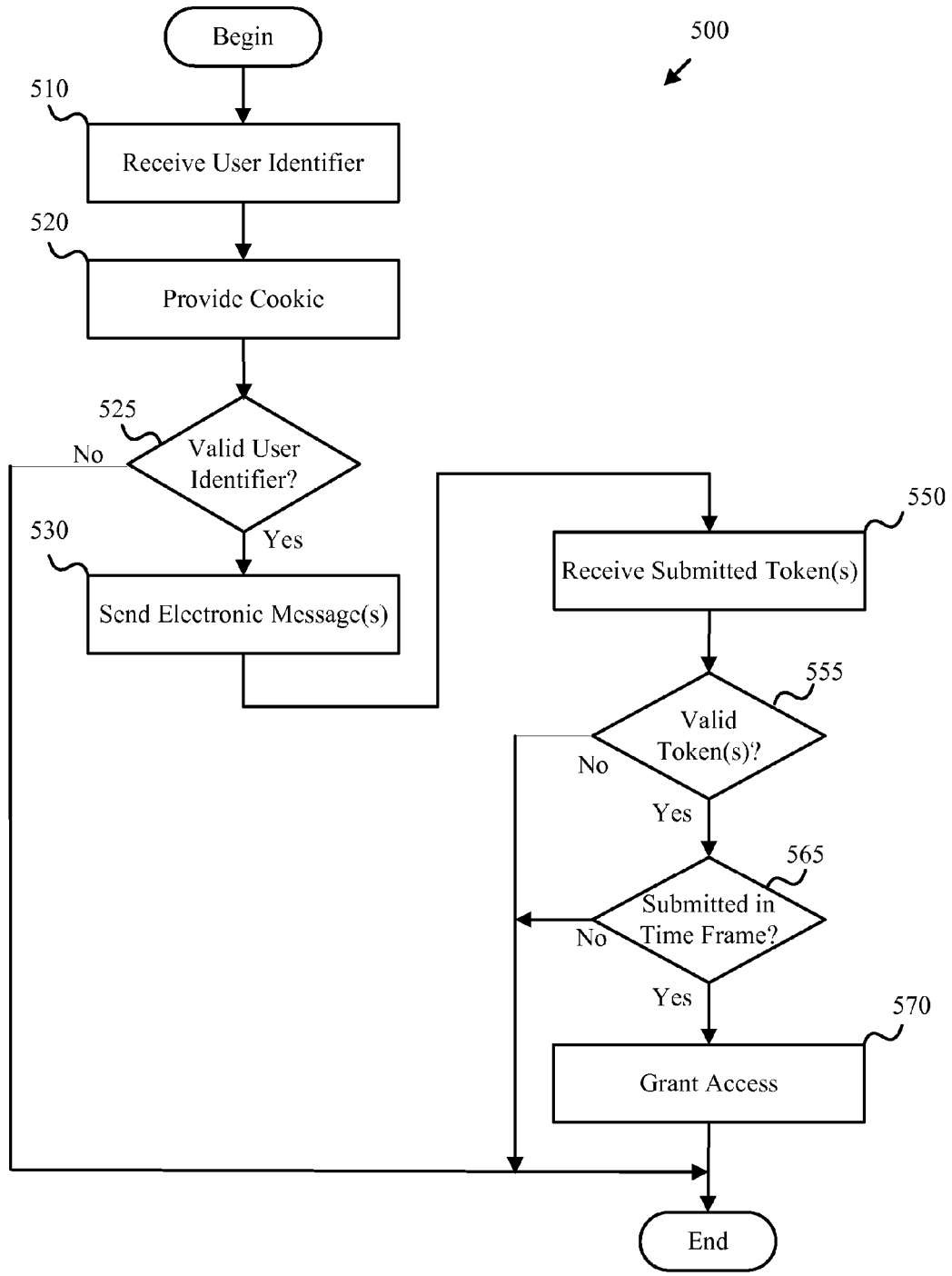
FIG. 5 is a schematic flow chart depicting one embodiment of a user authentication method from the perspective of a server in accordance with the present invention.

FIG. 5 is a flow chart depicting one embodiment of a user authentication method 500. As depicted, the user authentication method 500 includes receiving 510 a user identifier, providing 520 a cookie, determining 525 if the user identifier is valid, sending 530 an electronic message, receiving 550 a submitted token, determining 555 if the submitted tokens are valid, determining 565 if the tokens were submitted within a specified time frame, and granting 570 access. The user authentication method 500 facilitates access to a restricted resource by generating authentication tokens, distributing the tokens, and subsequently receiving and verifying the tokens submitted from a client computing device 110. The user authentication method 500 may be conducted by the authentication server 140 or the like.

Receiving 510 a user identifier may include receiving a unique identifier such as an electronic address from a client computing device 110. Receiving 510 a user identifier may also include establishing an application protocol for transferring the unique identifier from the client computing device 110 to the authentication server.

Providing 520 a cookie includes setting a session cookie and/or a non-persistent cookie on the client computing device. Providing 520 a cookie may include modifying text files or datastores that are outside of the scope of a browser environment, where the stored data may be utilized in a future authentication process. The cookie is preferably provided to the client prior to determining 525 if the user identifier is valid, in order to substantially eliminate the possibility of an intruder directly determining the validity of a randomly generated user identifier. Sending a cookie to each user requesting authentication therefore enhances security by making the immediate response to a submission of an invalid user identifier virtually indistinguishable from the immediate response to a submission of a valid user identifier.

Determining 525 if the user identifier is valid may include checking the application protocol used in the transmission of the unique identifier. For example, if http is the specified application protocol in use between the client computing device 110 and the requested resource, the unique identifier could be received 510 in the context of an HTML form submission, an http header, and the like. User identifiers submitted through other application protocols, or user identifiers not adhering to regular expressions, may be rejected. Determining 525 the validity may further include validating the existence of the address in a datastore or an email server.

Sending 530 an electronic message includes embedding an authentication token into the electronic message to facilitate authentication. The electronic message may then be sent to an electronic message account accessible by the client computing device and/or the user. Sending 530 an electronic message may include handling electronic message bounce backs or determining the most efficient delivery mechanism for the electronic messages.

Receiving 550 submitted tokens includes receiving one or more tokens from the client computing device. Receiving 550 submitted tokens may include combining the received tokens or using logical or mathematical operations on the received tokens to generate additional tokens. The received tokens and generated additional tokens may then be used to determine 555 if the submitted tokens are valid. Determining 555 if the submitted tokens are valid may include comparing the received and generated tokens with the original token or tokens saved on the server.

Determining 565 if the tokens were submitted within a valid time frame involves comparing the time of the original token generation and the time of token submission. If the difference exceeds a selected time interval, the client computing device 110 may be denied access to the restricted resource. If, however, the tokens are valid and are delivered with the selected time interval, the client computing device will be granted 570 access. In one embodiment, the selected time interval is 10 minutes.

Granting 570 access may include setting permissions, such as a session-level trust preservation mechanism, or sending a message granting access to particular resources on a resource server or the like.

Figure 6:
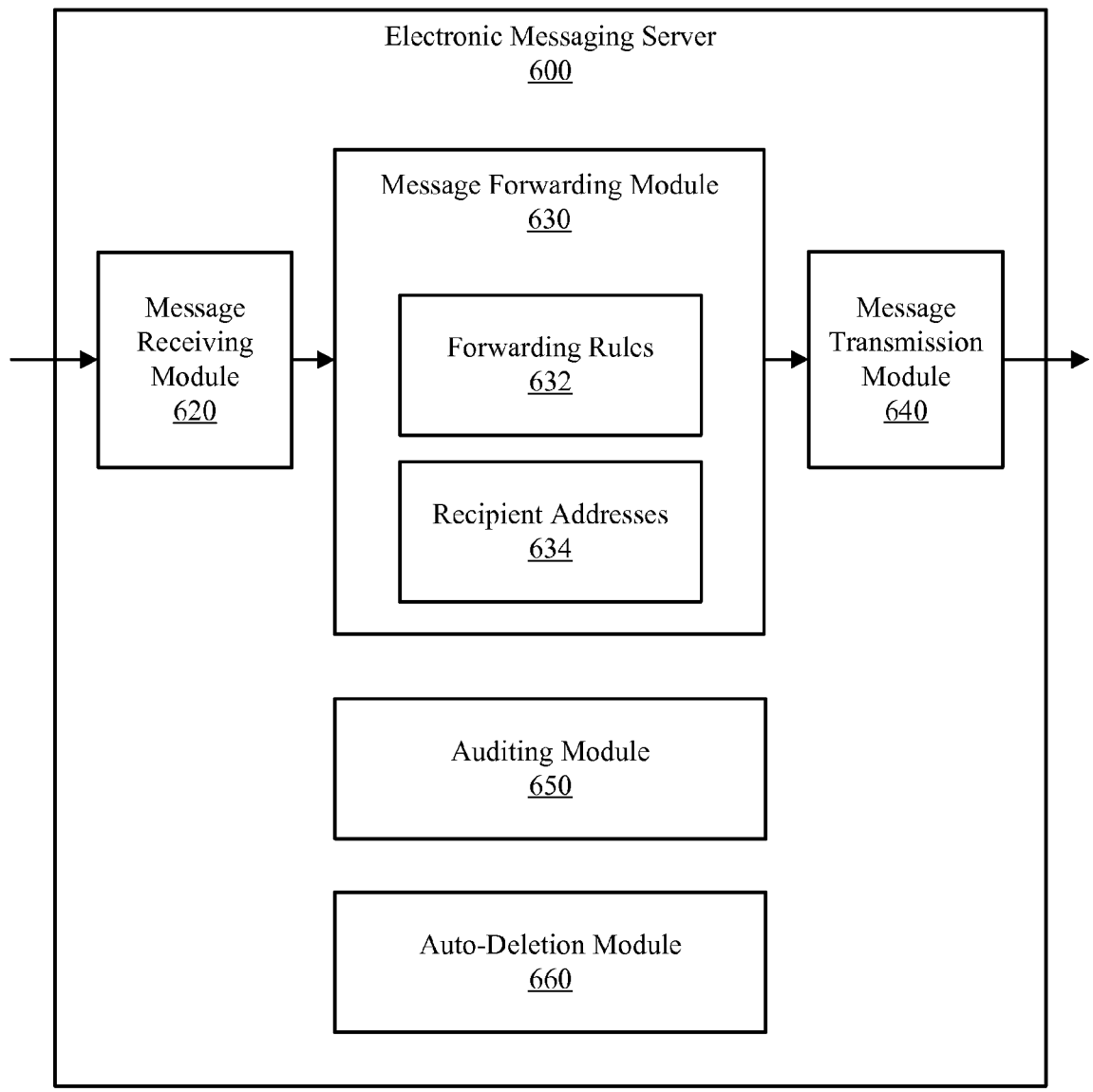
FIG. 6 is a block diagram depicting one embodiment of an electronic message communicator in accordance with the present invention.

FIG. 6 is a block diagram depicting one embodiment of an electronic messaging server communicator 600. As depicted, the electronic messaging server 600 includes a message receiving module 620, a message forwarding module 630, a message transmission module 640, an auditing module 650, and an auto-deletion module 660. The electronic message communicator 600 facilitates the delegation of authorized access to a restricted resource from one user or group to another. In the depicted embodiment, the delegation of authorized access is implemented by forwarding authentication information via electronic messages.

The electronic messaging server 600 incorporates the modules necessary to receive, process, and transmit electronic messages. The electronic messaging server 600 may be an existing electronic message service provider, such as gmail, yahoo mail, msn messenger and the like, or an electronic messaging server customized to provide additional functionality such as automatic auditing of resource access.

The message receiving module 620 receives electronic messages that may or may not pertain to authentication. For example, the receiving module 620 may receive an electronic message without authentication tokens, such as an electronic message from an associate. The ability of the message receiving module 620 to receive both normal electronic messages and authentication messages facilitates the use of established electronic message service providers. Because the messaging server 600 does not need to be customized to facilitate delegation, users may use their current electronic messaging providers without having to create a new electronic messaging account. Allowing users to use pre-established electronic messaging accounts allows for quick and easy implementation of the present invention.

In the depicted embodiment, the message forwarding module 630 determines if the message is to be forwarded as specified by one or more forwarding rules 632 and recipient addresses 634. Various types of delegation are achievable through the message forwarding module 630. The simplest form is complete delegation, where all authentication messages are sent to the appropriate electronic message account of the delegate.

Selective delegation provides delegation with more stringent rules and criteria. In the selective delegation model, only electronic messages that meet certain criteria are forwarded. For example, only authentication messages with authentication tokens from a specific site may be forwarded to the delegate, preventing an unauthorized user from gaining complete control of all of the delegator's resources. The forwarding rules 632 may require examination of a sequence of words, or a phrase, before the actual electronic message address to determine delegation. For example, if a message was delivered to user1@electronicaddress.com in the following format, "Delegate to: user2@electronicaddress.com<user1@ lectronicaddress.com>" the electronic message provider could automatically determine if the authentication message should be routed directly to user2, or if the authentication message was intended for user1. Assuming user2 has been established as an authorized user according to forwarding rules 632, the message would be forwarded to user2@ electronicaddress.com.

One time delegation is a subset of selective delegation. The delegator begins the authentication process and collects the required authentication tokens, but instead of submitting the tokens directly, one or more of the tokens are forwarded to the delegate. The delegator effectively forfeits access to the restricted resource using the tokens sent, although the delegator may maintain access through another set of tokens.

The forwarding rules 632 may reference recipient addresses 634 in order to generate forwarded messages. The recipient addresses 634 may contain a lookup table or other datastore intended to provide additional information to the message forwarding module 630. For example, if the message receiving module 620 receives a message with the phrase "Delegate to: user1," recipient address 634 may include the electronic address information for user1.

The message transmission module 640 sends the authentication message or a rejection notice to the intended recipient. The message transmission module 640 may generate an electronic message using a variety of protocols, any of which may be independent of the protocol used by the message receiving module. For example, the message receiving module 620 may receive an email message, while the message transmission module 640 may transmit that electronic message in the form of an instant message.

The electronic messaging server 610 may further include an auditing module 650. The auditing module 650 keeps a record of all forwarded delegations. In one embodiment, an email notice is sent through the electronic messaging server every time a delegated user accesses a resource. The auditing module 650 may track the quantity of these email notices, effectively creating a log of the number and type of accesses made by any delegate. The auditing module 650 may also be able to revoke permissions for delegates. By removing the corresponding forwarding rule, the auditing module 650 may revoke permission for future authentications of a delegate.

The auto-deletion module 660 automatically deletes messages that have been forwarded. The auto-deletion module 660 may determine if the electronic message has been used or forwarded and subsequently deletes, archives, or further categorizes the authentication message. The auto-deletion module may further include a user interface to control auto deletion settings.

Figure 7:
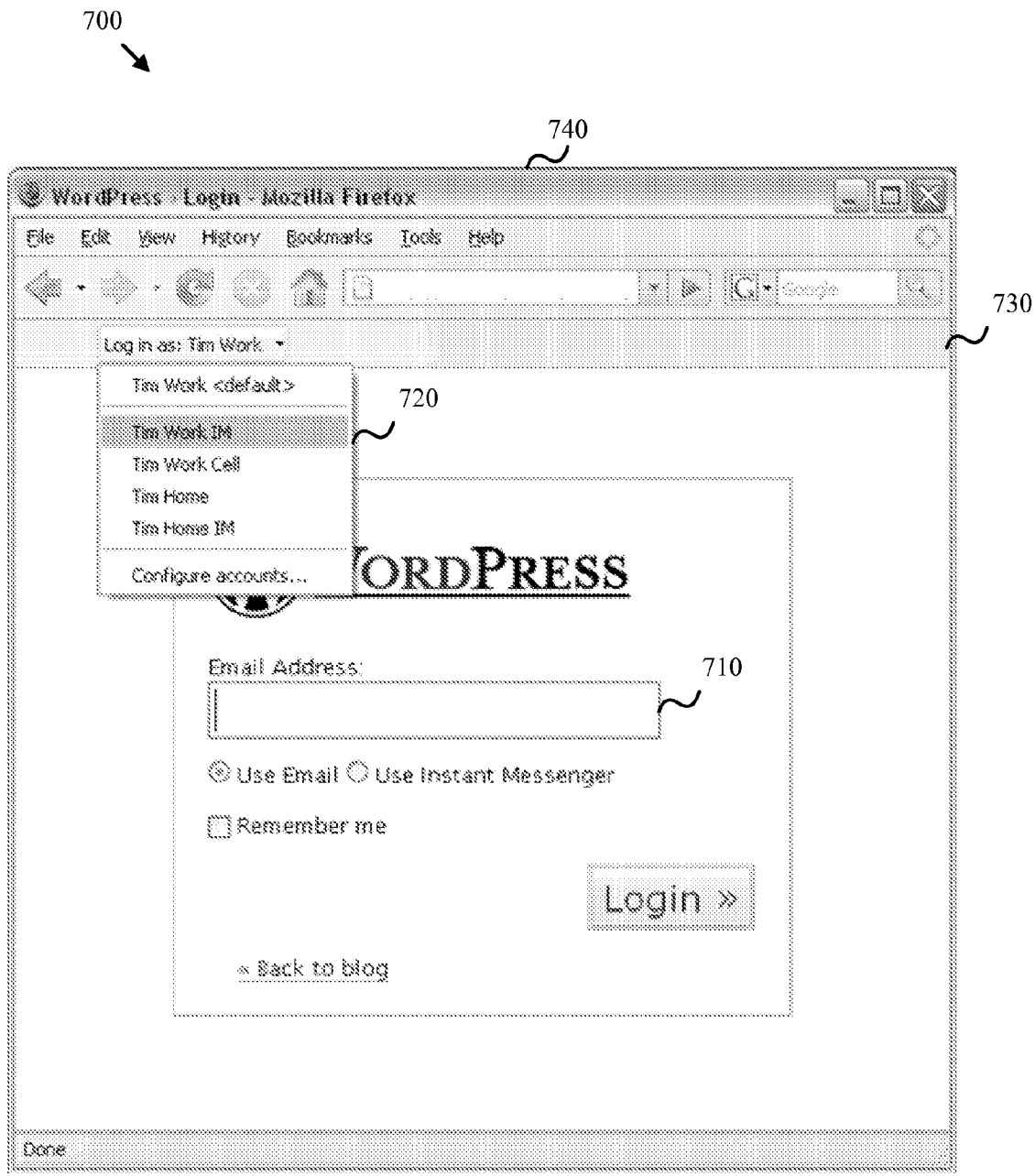
FIG. 7 is a screenshot of one embodiment of a user authentication interface in accordance with the present invention.

FIG. 7 is a screenshot of one embodiment of a user authentication interface 700. As depicted, the user authentication interface includes an html form 710, an authentication settings control 720, a browser toolbar 730, and a web browser 740. The sample user authentication system 700 shown is an example of an authentication page for someone requesting access to a restricted resource. In this example, the restricted resource is web based software.

The html form 710 submits a unique identifier to a server. The unique identifier may be an electronic address, such as an email address, cell phone number, pager address, an instant messaging address, or the like. The authentication settings control 720 enables the user to determine which protocol should be used for delivering authentication tokens. A user may have multiple authentication profiles that may be used to access different resources.

Depending on user preferences, authentication messages may be delivered through different channels based on settings chosen by the user. The channels displayed in FIG. 7 include a cell phone text messaging channel, several email channels, and several instant messaging channels. Different channels may be selected depending on the availability and speed of the channels. For example, delivery of authentication tokens through instant messaging might be preferred because there is minimal delay for the delivery of authentication tokens over instant messaging services. In another environment, instant messaging channels may be blocked, so a more appropriate channel such as email could be selected by the user. In this example, the authentication settings control 720 is included within a browser toolbar 730. The browser toolbar 730 may include other tools related to authentication or general browsing. The authentication settings control 720 may be integrated into an existing toolbar and does not have to be located in a stand alone toolbar to function properly.

Once the authentication settings have been specified by the user and the html form has been successfully submitted, the various authentication tokens may be distributed through multiple channels. The web browser 740, in one embodiment, stores the directly delivered authentication tokens in the form of cookies. The web browser 740 may further store authentication tokens received from one or more electronic messages.

Figure 8:
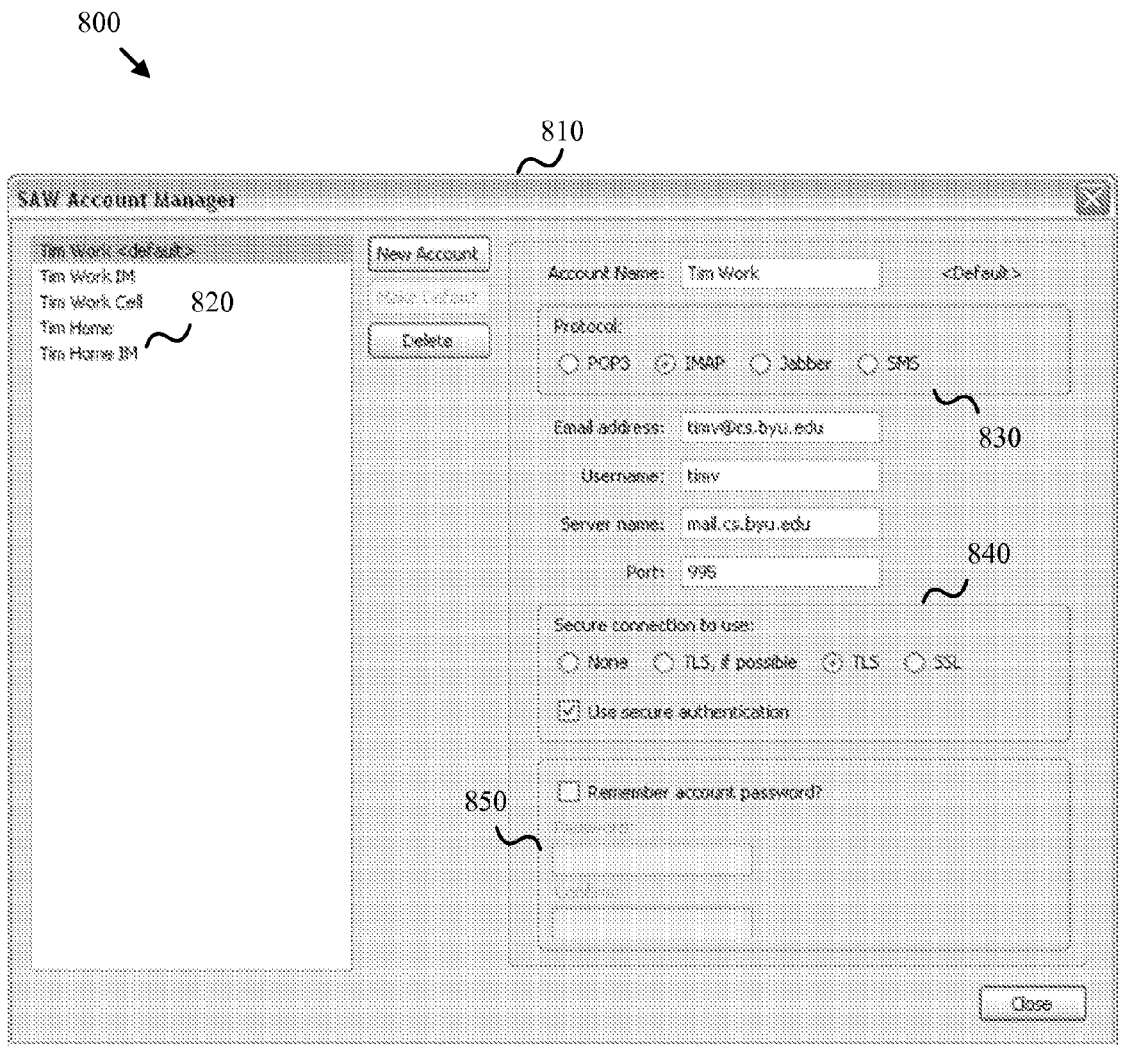
FIG. 8 is a screenshot of one embodiment of an authentication profile manager in accordance with the present invention.

FIG. 8 is a screenshot of one embodiment of an authentication profile manager 800. As depicted, the authentication profile manager 800 includes a graphical user interface 810, an account list window 820, a protocol selector 830, a secure connection selector 840, and a password entry control 850. The authentication profile manager 800 is one example of an interface that enables users to establish accounts and channels for authentication token delivery.

The graphical user interface 810 provides visible components that enable users to adjust profile settings. The account list window 820 displays authentication profiles previously established by the user. Users may want to make profile modifications, specifically in cases where an electronic message address, protocol, security setting, password, or the like has changed. The account list window 820 provides a way for users to select and then modify previously established accounts. Users may further modify or choose a protocol using the protocol selector 830 as depicted in FIG. 8. As shown, the protocol selector 830 may include a variety of protocols for automatic electronic message retrieval. The protocols shown in the depicted example include pop, IMAP, Jabber, and SMS.

In one embodiment, the electronic message retrieval process is secured. The secure connection selector 840 may be used to select a secure connection for electronic message retrieval. While the security mechanisms shown in this example include Transport Layer Security (TLS) and Secure Sockets Layer (SSL), the present invention may implement any available secure connection.

In situations where a username and password are required to retrieve electronic messages, the password entry control 850 may be used to automatically submit the information. If the username and password are valid the electronic messages pertaining to that profile will be automatically retrieved.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An authorization server to facilitate authentication of a user requesting access to an access restricted resource, the authorization server comprising:
one or more hardware processors being configured to execute:
a validation software subroutine that receives a user identifier for a user that is requesting access to an access restricted resource from a client computing device, the user identifier being received over a first communication channel comprising a direct communication channel in conjunction with the request to access the access restricted resource, wherein the validation software subroutine further determines if the user identifier is a valid identifier corresponding to an electronic address;
a token generation software subroutine that generates a plurality of authentication tokens, including a cookie and an electronic message token, to be distributed over different communication channels;
a token distribution software subroutine that sends, in response to the validation software subroutine validating the user identifier, the cookie over the first communication channel to the client computing device, and sends the electronic message token over a second communication channel to a messaging server that provides a messaging service to the user using the electronic address, thereby determining that the electronic address exists, is valid, and uniquely identifies the user, the second communication channel thereby comprising an indirect communication channel for communicating with the client computing device; and
a token validation software subroutine configured to authenticate the client computing device to authorize access to the access restricted resource when receiving both the cookie and the electronic message token such that access to the access restricted resource requires receipt of the cookie and the electronic message token which were distributed over different communication channels, the electronic message token having been automatically collected and submitted at the client computing device.

2. The authentication server of claim 1, wherein the token validation software subroutine also determines if a token has expired.

3. The authentication server of claim 1, wherein the token distribution software subroutine also sends another electronic message comprising a second electronic message token to a second messaging server that provides a messaging service to the user using another electronic address corresponding to the user identifier, and the token validation also authenticates the client computing device to authorize access to the access restricted resource when receiving at least two of the tokens distributed by the token distribution software subroutine.

4. The authentication server of claim 1, wherein the token distribution software subroutine sends n tokens, where n is greater than two, and wherein the token validation software subroutine authenticates the client computing device to authorize access to the access restricted resource when receiving m tokens, where m is greater than 1, which were distributed by the token distribution software subroutine.

5. The authentication server of claim 1, wherein the validation software subroutine verifies a password.

6. The authentication server of claim 1, wherein the electronic message is selected from the group consisting of an email message, a telephone text message, a pager message, and an instant message.

7. The authentication server of claim 1, wherein the token distribution software subroutine includes delegation information within the electronic message.

8. The authentication server of claim 1, further comprising a communication software subroutine that establishes a secure connection between the client computing device and the authentication server.

9. The authentication server of claim 8, wherein the communication software subroutine encrypts the electronic message.

10. The authentication server of claim 1, further comprising a delegation software subroutine that enables delegation of access privileges.

11. The authentication server of claim 1, further comprising an auditing software subroutine.

12. The authentication server of claim 1, wherein the plurality of authentication tokens are configured for one time use.

13. The authentication server of claim 1, wherein the cookie is a session cookie.

14. A client computing device to authenticate a user requesting access to an access restricted resource, the client computing device comprising:
one or more hardware processors being configured to execute:
an access request software subroutine that submits a user identifier to an authentication server for a user that is requesting access to an access restricted resource, the user identifier corresponding to an electronic address, the user identifier being submitted over a first communication channel comprising a direct communication channel between the client computing device and the authentication server in conjunction with the request to access the access restricted resource;
a browser that receives a cookie, the cookie comprising a first authentication token, the cookie being received over the first communication channel;
a token collection software subroutine that retrieves an electronic message, over a second communication channel from a messaging server, thereby determining that the electronic address exists, is valid, and uniquely identifies the user, that was sent to the electronic address, the electronic message comprising a second authentication token, wherein the first and second tokens are received in response to the submission of the user identifier;
wherein the browser submits the first authentication token to the authentication server over the first communication channel; and
a token submission software subroutine that submits the second authentication token to the authentication server over the first communication channel in conjunction with the submission of the first authentication token to request access to the access restricted resource such that access is requested by presenting both the first and the second authentication tokens, the tokens having been automatically collected and submitted at the client computing device.

15. The client computing device of claim 14, further comprising a user interface software subroutine that displays a single-click login control.

16. The client computing device of claim 15, wherein submitting the user identifier occurs in response to user activation of the single-click login control.

17. The client computing device of claim 14, wherein the token collection software subroutine retrieves another electronic message comprising a third authentication token from another electronic address corresponding to the user identifier.

18. The client computing device of claim 14, wherein the token collection software subroutine retrieves at least m valid tokens from a set of n distributed tokens wherein m and n are integers and m is less than n.

19. The client computing device of claim 14, wherein the electronic message is selected from the group consisting of an email message, a telephone text message, a pager message, and an instant message.

20. The client computing device of claim 14, wherein the electronic message is an encrypted electronic message.

21. The client computing device of claim 14, wherein the cookie is a session cookie.

22. A system to authenticate a user requesting access to an access restricted resource, the system comprising:
an authentication server comprising one or more hardware processors being configured to execute:
a user validation software subroutine that receives a user identifier from a client computing device and determines if the user identifier is a valid identifier corresponding to an electronic address, the user identifier being received over a first communication channel comprising a direct communication channel between the authentication server and the client computing device in conjunction with a request to access the access restricted resource,
a token generation software subroutine that generates a plurality of authentication tokens for the client computing device, including a cookie and an electronic message token, to be distributed over different communication channels,
a token distribution software subroutine that sends, in response to the validation software subroutine validating the user identifier, the cookie over the first communication channel to the client computing device and sends the electronic message token over a second communication channel to a messaging server that provides a messaging service to the user using the electronic address, thereby determining that the electronic address exists, is valid, and uniquely identifies the user, the second communication channel thereby comprising an indirect communication channel for communicating with the client computing device; and a token validation software subroutine that authenticates the client computing device to authorize access to the access restricted resource when receiving both the cookie and the electronic message token such that access to the access restricted resource requires receipt of the cookie and the electronic message token which were distributed over different communication channels, the electronic message token having been automatically collected and submitted at the client computing device;

a client computing device comprising one or more hardware processors being configured to execute:

an access request software subroutine that submits the user identifier over the first communication channel to the authentication server for a user that is requesting access to an access restricted resource, a token collection software subroutine that receives the plurality of authentication tokens from the plurality of communication channels, and a token submission software subroutine that submits the cookie and the electronic message token to the authentication server.

23. The system of claim 22, wherein the first communication channel comprises an HTTPS connection, and wherein the electronic message token is included within one of an email, a text message, an instant message, or a page.

24. The system of claim 22, wherein the messaging server forwards the electronic message token to the user.

25. The system of claim 22, wherein the token collection software subroutine receives at least m valid tokens from a set of n distributed tokens.

26. The system of claim 22, wherein the token submission software subroutine submits at least m valid tokens from a set of n distributed tokens.

27. A method, performed by an authentication server, to authenticate a user requesting access to an access restricted resource, the method comprising:

receiving a user identifier from a client computing device for a user that is requesting access to an access restricted resource, the user identifier being received over a first communication channel comprising a direct communication channel between the authentication server and the client computing device in conjunction with the request to access the access restricted resource;

determining if the user identifier is a valid identifier corresponding to an electronic address;

generating a plurality of authentication tokens, including a cookie and an electronic message token, to be sent to the client computing device over different communication channels, including at least one direct and at least one indirect channel;

sending, in response to validating the user identifier, the cookie over the first communication channel to the client computing device and sending the electronic message token over a second communication channel to a messaging server that provides a messaging service to the user using the electronic address, thereby determining that the electronic address exists, is valid, and uniquely identifies the user, the second communication channel thereby comprising an indirect communication channel for communicating with the client computing device;

receiving the cookie and the electronic message token from the client computing device over the first communication channel; and authenticating the client computing device to authorize access to the access restricted resource when receiving both the cookie and the electronic message token such that access to the access restricted resource requires receipt of the cookie and the electronic message token which were distributed over different communication channels, the electronic message token having been automatically collected and submitted at the client computing device.

28. The method of claim 27, further comprising determining if a token has expired.

29. The method of claim 27, further comprising sending another electronic message comprising a second electronic message token to a second messaging server that provides a messaging service to the user using another electronic address corresponding to the user identifier, and authenticating the client computing device to authorize access to the access restricted resource when receiving at least two of the tokens distributed by a token distribution software subroutine.

30. The method of claim 27, further comprising verifying a password.

31. The method of claim 27, wherein the cookie is a session cookie.

32. The method of claim 27, wherein the electronic message is selected from the group consisting of an email message, a telephone text message, a pager message, and an instant message.

33. The method of claim 27, wherein the electronic message is encrypted.

34. The method of claim 27, wherein sending the electronic message comprises conducting communications in a protocol selected from the group consisting of pop, IMAP, SMS, Jabber, an email protocol, an instant messaging protocol, a paging protocol, and http.

35. The method of claim 27, further comprising including delegation information within the electronic message.

36. The method of claim 27, further comprising establishing a secure connection with the client computing device.

37. The method of claim 27, further comprising determining a user's permission level for the access restricted resource.

38. A method, performed by a client computing device, to facilitate authentication of a user requesting access to an access restricted resource, the method comprising:

submitting a user identifier to an authentication server for a user requesting access to an access restricted resource via a browser, the user identifier corresponding to an electronic address, the user identifier being submitted over a first communication channel comprising a direct communication channel between the authentication server and the client computing device in conjunction with the request to access the access restricted resource;

receiving a cookie comprising a first authentication token, the cookie being received over the first communication channel;

retrieving an electronic message, sent to the electronic address, from a messaging server, the electronic message comprising a second authentication token sent over a second communication channel to the messaging server to the electronic address, thereby determining that the electronic address exists, is valid, and uniquely identifies the user, the second communication channel being different from the first communication channel and comprising an indirect communication channel for communicating with the client computing device wherein the first and second tokens are received in response to the submission of the user identifier;

submitting the first and second authentication tokens to the authentication server over the first communication channel to request access to the access restricted resource such that access is requested by presenting both the first and second authentication tokens, the tokens having been automatically collected and submitted at the client computing device.

39. The method of claim 38, further comprising delegating access by forwarding the electronic message to a selected user.

40. The method of claim 38, further comprising presenting a single-click login control to the user.

41. The method of claim 40, wherein submitting the user identifier occurs in response to user activation of the single-click login control.

42. The method of claim 38, further comprising retrieving another electronic message, from a second messaging server, comprising a third authentication token from another electronic address corresponding to the user identifier.

43. The method of claim 38, further comprising collecting at least m valid tokens m from a set of n distributed tokens.

44. The method of claim 38, further comprising auto-deleting the electronic message in response to retrieval of the electronic message.

45. The method of claim 38, wherein the cookie is a session cookie.

46. The method of claim 38, wherein the electronic message is selected from the group consisting of an email message, a telephone text message, a paging message, and an instant message.

47. The method of claim 38, wherein the electronic message is encrypted.

48. The method of claim 38, further comprising auditing messages.

49. The method of claim 38, wherein retrieving the electronic message comprises conducting communications in a protocol selected from the group consisting of pop, IMAP, SMS, Jabber, an email protocol, an instant messaging protocol, a paging protocol, and http.

50. The method of claim 38, wherein the access restricted resource is selected from the group consisting of a server, a website, a content feed, an intra-network, and a wireless network.

* * * * *